United States Patent Office 2,832,684
Patented Apr. 29, 1958

2,832,684

SEPARATION OF OIL AND FOODSTUFFS FROM HERRINGS

Severin Sirnes, Haugesund, Norway

No Drawing. Application December 22, 1953
Serial No. 404,804

Claims priority, application Norway March 26, 1953

4 Claims. (Cl. 99—7)

In the manufacture of oil and cattle food from herrings the method employed by most herring oil factories comprises "cooking" of the raw material (herrings) in open vessels, separating liquids from solid matter by passing the "cooked" material through continuous operating screw presses, drying the press cake and subjecting the press liquid to centrifugal treatment to separate oil therefrom. The remaining liquid (the so-called glue water) usually contains about 5–6 percent of solids which are of great nutritive value and can be recovered by evaporation. Mostly the evaporation of the glue water is carried out in "multiple effect" evaporators, in which the evaporation takes place in two or more stages at different temperatures. The "glue water" concentrate is a valuable chicken food and has been brought on the market under the designation "condensed fish solubles." In some factories the glue water concentrate is mixed with moist press cake and dried together with the latter to produce the so-called "whole meal" containing substantially all of the non fatty solids of the raw material.

The above outlined procedure of manufacturing oil and cattle food from herrings and the like fat fish is well known and described in the literature, see for example, (1) The Technology of Herring Utilization—Report of the F. A. O. Meeting on Herring Technology, Bergen, Norway, September 24–29, 1950, published by A/S John Greigs Boktrykkeri, Bergen, 1953, and (2) Foredrag ved Sildoljeindustriens Kursus i Bergen, November 22–27, 1948, published by A/S J. W. Eides Boktrykkeri, Bergen, 1949.

The present invention relates to these well known processes of manufacturing oil and cattle food from herrings and like fat fishes and has for its object a method by means of which it is made possible by simple means to increase the output of high grade oil from the raw materials and at the same time to obtain high quality cattle foods.

As above explained the liquid leaving the presses in which the cooked herrings are treated to separate solid matter from liquid is subjected to centrifugal treatment to separate oil from aqueous liquid ("glue water"). Even after this centrifugation the liquid contains some oil in a dispersed condition and this oil will be carried over into the food products, produced by evaporation of the glue water. This percentage of oil represents a loss from an economical point of view, whether the glue water is utilized for the production of food products or not, because the oil entering the food products is not a desirable constituent thereof and has the effect of lowering the sales value of the product.

One of the reasons for this consists therein that the oil contents will increase the tendency to self-ignition of the dry product. A product poor in fat also will be less liable to become rancid.

An important feature of the process according to the invention as compared with the methods at present in use consists therein that the press liquid is subjected to centrifugal treatment to separate oil therefrom subsequent to an evaporation treatment. In other words, the liquid leaving the presses is subjected to an evaporation process as a separate step preceding a centrifugal treatment. In the course of this evaporation process the difference between the specific gravity of the aqueous liquid and that of the oil dispersed therein will be increased, and this has the effect of facilitating the separation of oil from liquid. As a consequence of this a much higher percentage of oil becomes separated from the liquid than otherwise possible.

The quantity of glue water to be passed through the centrifugal machines for removal of residual oil will be much smaller in the process according to the invention, than in prior methods of operation. The number of centrifugal machines of a definite capacity required in a specific factory will be reduced, and the percentage of residual oil in the centrifuged glue water will be much smaller in relation to percentage of solids, than in the case of an unconcentrated glue water being handled in the centrifuges.

As a consequence of this the percentage of fat in such products ("whole meal") which contain the solids of press cake as well as of glue water (concentrated in accordance with the invention) will be lower than in products ("whole meal") obtained according to conventional methods. The increase in output of oil obtainable according to the invention will in part also be due to the fact, that during the evaporation prior to the centrifugal treatment a disruption of the oil cells in such sludge which may be present in the glue water will take place. This results in liberation of an additional quantity of oil, which will then become separated from aqueous liquid in the centrifugal machine thereby increasing the amount of oil leaving the machine.

It is obvious that the evaporation of the glue water taking place before the centrifugation step should not be carried out to such a high degree of concentration as to increase its viscosity to a degree which renders efficient centrifugation difficult. When a high degree of concentration is desired, the liquid will have to be subjected to continued evaporation subsequent to the centrifugation step. This continued evaporation may be carried out under reduced pressure ("vacuum"), under atmospheric pressure or under a pressure above atmospheric, but under ordinary conditions the evaporation under atmospheric or subatmospheric pressure will be preferred. The evaporation step or steps preceding the centrifugation under ordinary conditions will most advantageously be carried out under atmospheric or superatmospheric pressures, because otherwise pressures and temperatures would have to be changed before as well as after the centrifugation operation, because ordinary centrifugal machines operate at atmospheric pressure.

Otherwise any type of evaporators or centrifugal machines may be made use of in carrying out the process according to the invention. It is an essential characteristic of the process according to the invention that the heating of this raw material (herrings or other fat fish) taking place before the pressing or equivalent treatment to separate liquid from solids is carried out in the presence of the water contained in the raw material and not under such conditions as to result in a partial or complete drying of the material. The conditions necessary to bring about a substantial drying of the material would have an undesirable effect on the oil in the material under treatment, so that the fish oil obtained by a subsequent centrifugal treatment of the press liquid will not be of the high quality otherwise obtainable.

I claim:

1. In the manufacture of oil and foodstuffs from herrings and other fat fishes by heating the raw material, pressing the heated material to express liquid therefrom and drying the solid residuum, separating oil from the expressed liquid and evaporating the liquid to bring about concentration of the solids contained therein; the process which comprises subjecting the said liquid to evaporation in at least two separate steps and subjecting the liquid to a centrifugal treatment to separate oil therefrom between said evaporation steps, the said evaporation steps and the said steps of heating the raw material before pressing and of drying the solid residuum from the pressing operation being carried out as separate operations.

2. Process according to claim 1 in which the said evaporation steps are carried out under different pressures.

3. Process according to claim 1, in which one at least of the said evaporation steps is carried out under a pressure below atmospheric pressure.

4. Process according to claim 1, in which at least one of the said evaporation steps is carried out at atmospheric pressure.

References Cited in the file of this patent

UNITED STATES PATENTS

| | | |
|---|---|---|
| 2,497,367 | Notevarp | Feb. 14, 1950 |

FOREIGN PATENTS

| | | |
|---|---|---|
| 612,554 | Great Britain | 1948 |
| 621,877 | Great Britain | 1949 |